US008887045B2

(12) United States Patent
Faivre et al.

(10) Patent No.: US 8,887,045 B2
(45) Date of Patent: Nov. 11, 2014

(54) SYSTEM AND METHOD FOR PROVIDING DATA LINKS

(75) Inventors: Aaron James Faivre, Washington, IL (US); Nigel Alan Lewis, Brentwood, TN (US); Federico Folchi-Vici, Peoria Heights, IL (US)

(73) Assignee: Caterpillar Inc., Peoria, IL (US)

( * ) Notice: Subject to any disclaimer, the term of this patent is extended or adjusted under 35 U.S.C. 154(b) by 1672 days.

(21) Appl. No.: 12/155,898

(22) Filed: Jun. 11, 2008

(65) Prior Publication Data
US 2009/0313563 A1 Dec. 17, 2009

(51) Int. Cl.
| G06F 17/30 | (2006.01) |
| G06Q 10/00 | (2012.01) |
| G06Q 30/00 | (2012.01) |
| G06F 17/00 | (2006.01) |
| G06Q 30/06 | (2012.01) |
| G06Q 10/06 | (2012.01) |
| G06F 9/44 | (2006.01) |

(52) U.S. Cl.
CPC .......... *G06F 17/30286* (2013.01); *G06Q 30/06* (2013.01); *G06F 17/30899* (2013.01); *G06Q 10/06* (2013.01); *G06F 9/4446* (2013.01); *G06F 17/30014* (2013.01)
USPC .......... 715/705; 715/780; 715/804; 715/207; 715/234; 348/192; 348/193; 725/107; 707/E17.119; 707/E17.095

(58) Field of Classification Search
CPC .. G06Q 30/06; G06Q 10/06; G06F 17/30286; G06F 17/30899; G06F 17/30014; G06F 9/4446

USPC .......... 348/192–193; 725/107; 715/804, 207, 715/234, 690; 707/E17.119, E17.095
See application file for complete search history.

(56) References Cited

U.S. PATENT DOCUMENTS

| 5,802,497 A | 9/1998 | Manasse |
| 5,809,317 A * | 9/1998 | Kogan et al. .................. 715/236 |
| 5,870,717 A | 2/1999 | Wiecha |
| 5,963,205 A * | 10/1999 | Sotomayor ................... 715/236 |
| 6,122,647 A * | 9/2000 | Horowitz et al. ............. 715/205 |
| 6,209,006 B1 * | 3/2001 | Medl et al. .................... 715/205 |
| 6,650,736 B1 | 11/2003 | Unger et al. |

(Continued)

OTHER PUBLICATIONS

Crowston et al., The effects of linking on genres of Web documents, 1999, Proceedings of the 32nd Annual Hawaii International Conference on System Sciences, (0-7695-0001-3) . p. 2 pp.*

(Continued)

*Primary Examiner* — Jordany Nunez
(74) *Attorney, Agent, or Firm* — Finnegan, Henderson, Farabow, Garrett & Dunner LLP

(57) ABSTRACT

Systems and methods for providing data verification are disclosed. In one exemplary method, the data is displayed in at least one display field and information related to the data is stored in at least one source file. The method includes creating a link between the display field and the source file, wherein the link is displayed in a verification panel associated with the display field. The method further includes saving link identification information, wherein the link identification information includes category information of the display field and location information of the source file, and obtaining the source file at the location specified by the link identification information, if the link is selected for display; and opening the source file and displaying the source file.

14 Claims, 6 Drawing Sheets

(56) References Cited

U.S. PATENT DOCUMENTS

| | | | |
|---|---|---|---|
| 6,785,671 B1* | 8/2004 | Bailey et al. | 705/26.81 |
| 6,948,126 B2* | 9/2005 | Malamud et al. | 715/715 |
| 7,107,517 B1* | 9/2006 | Suzuki et al. | 715/207 |
| 7,424,669 B2* | 9/2008 | Bhogal et al. | 715/230 |
| 7,653,592 B1* | 1/2010 | Flaxman et al. | 705/38 |
| 7,748,029 B2* | 6/2010 | Ross | 726/6 |
| 7,958,163 B2* | 6/2011 | Brentano et al. | 707/805 |
| 7,970,867 B2* | 6/2011 | Anonsen et al. | 709/219 |
| 8,271,446 B2* | 9/2012 | Tailliez et al. | 707/658 |
| 8,316,023 B2* | 11/2012 | Cole | 707/736 |
| 2002/0016923 A1* | 2/2002 | Knaus et al. | 713/200 |
| 2002/0053033 A1* | 5/2002 | Cooper et al. | 713/201 |
| 2002/0083341 A1* | 6/2002 | Feuerstein et al. | 713/201 |
| 2002/0107699 A1 | 8/2002 | Rivera et al. | |
| 2002/0124005 A1* | 9/2002 | Matson et al. | 707/101 |
| 2002/0129058 A1* | 9/2002 | Story et al. | 707/513 |
| 2003/0009489 A1* | 1/2003 | Griffin | 707/500 |
| 2003/0033162 A1* | 2/2003 | Houssiaux et al. | 705/1 |
| 2003/0061226 A1* | 3/2003 | Bowman et al. | 707/100 |
| 2003/0093545 A1* | 5/2003 | Liu et al. | 709/231 |
| 2003/0106005 A1* | 6/2003 | Jue et al. | 714/741 |
| 2003/0145017 A1* | 7/2003 | Patton et al. | 707/104.1 |
| 2003/0229858 A1* | 12/2003 | Keohane et al. | 715/526 |
| 2004/0205633 A1* | 10/2004 | Martinez et al. | 715/526 |
| 2004/0249783 A1* | 12/2004 | Best et al. | 707/1 |
| 2005/0066270 A1* | 3/2005 | Ali et al. | 715/513 |
| 2005/0182691 A1 | 8/2005 | Karkoff et al. | |
| 2005/0222919 A1 | 10/2005 | Pellerin et al. | |
| 2006/0036502 A1 | 2/2006 | Farrell | |
| 2006/0053076 A1* | 3/2006 | Kremen | 705/51 |
| 2006/0095373 A1* | 5/2006 | Venkatasubramanian et al. | 705/40 |
| 2006/0195338 A1* | 8/2006 | Seibel et al. | 705/1 |
| 2007/0022024 A1* | 1/2007 | Dowty et al. | 705/28 |
| 2007/0055657 A1* | 3/2007 | Yano | 707/3 |
| 2007/0073591 A1* | 3/2007 | Perry et al. | 705/26 |
| 2007/0073592 A1 | 3/2007 | Perry et al. | |
| 2007/0073599 A1 | 3/2007 | Perry et al. | |
| 2007/0136364 A1* | 6/2007 | Mejia et al. | 707/103 R |
| 2007/0290037 A1 | 12/2007 | Arellanes et al. | |
| 2008/0127305 A1* | 5/2008 | Ross | 726/2 |
| 2009/0063294 A1* | 3/2009 | Hoekstra et al. | 705/26 |
| 2009/0222347 A1* | 9/2009 | Whitten | 705/14 |
| 2010/0306128 A1* | 12/2010 | Moffat et al. | 705/36 R |
| 2011/0055099 A1* | 3/2011 | Paul et al. | 705/321 |
| 2011/0066645 A1* | 3/2011 | Cooper et al. | 707/770 |
| 2012/0239618 A1* | 9/2012 | Kung | 707/621 |
| 2013/0054260 A1* | 2/2013 | Evans | 705/2 |
| 2014/0082111 A1* | 3/2014 | Schneider et al. | 709/206 |
| 2014/0123218 A1* | 5/2014 | Schneck et al. | 726/1 |

OTHER PUBLICATIONS

Front page of eopinion.com. Web-page. Retrieved on Jun. 10, 2008. Retrieved from Internet: <URL: www.epinion.com>.

Front page of bizrate.com. Web-page. Retrieved on Jun. 10, 2008. Retrieved from Internet: <URL: www.bizrate.com>.

Front page of pricegrabber.com. Web-page. Retrieved on Jun. 10, 2008. Retrieved from Internet: <URL: www.pricegrabber.com>.

Front page of dealtime.com. Web-page. Retrieved on Jun. 10, 2008. Retrieved from Internet: <URL: www2.dealtime.com>.

Front page of smater.com. Web-page. Retrieved on Jun. 10, 2008. Retrieved from Internet: <URL: www.smarter.com>.

Front page of pricerunner.com. Web-page. Retrieved on Jun. 10, 2008. Retrieved from Internet: <URL: www.pricerunner.com>.

Front page of buyersedge.com. Web-page. Retrieved on Jun. 10, 2008. Retrieved from Internet: <URL: www.buyersedge.com>.

Front page of pricescan.com. Web-page. Retrieved on Jun. 10, 2008. Retrieved from Internet: <URL: www.pricescan.com>.

Front page of shopping.yahoo.com. Web-page. Retrieved on Jun. 10, 2008. Retrieved from Internet: <URL: www.shopping.yahoo.com>.

Front page of cnet.com. Web-page. Retrieved on Jun. 10, 2008. Retrieved from Internet: <URL: www.cnet.com>.

Front page of shopping.msn.com. Web-page. Retrieved on Jun. 10, 2008. Retrieved from Internet: <URL: www.shopping.msn.com>.

* cited by examiner

|  |  |  |
|---|---|---|
| CATEGORY |  | ▽ ～421 |
| SUBCATEGORY |  | ▽ ～422 |
| DESCRIPTION |  | ～423 |
| LINK/FILE | ○ LINK    ○ FILE |  ～424 |
| LOCATION | (BROWSE) | ～425 |
| DISPLAY | ○ YES    ○ NO |  ～426 |
| SORT ORDER | 1 | ▽ ～427 |

(OK)  (CANCEL)

FIG. 4B

| EXPORT | FILE NAME | PATH | FILES SIZE | DESCRIPTION |
|---|---|---|---|---|
| ✓ | FUEL XSL | C:\... | 440 KB | FUEL ESTIMATOR |
| ✓ | INVENTORY | D:\... | 73KB | INVENTORY |
| . | . | . | . | . |
| . | . | . | . | . |
| . | . | . | . | . |
| . | . | . | . | . |

(EXPORT)  (CANCEL)

FIG. 4C

SYSTEM AND METHOD FOR PROVIDING DATA LINKS

TECHNICAL FIELD

The present disclosure relates generally to a system and method for providing data validity verification, and relates more particularly to a system and method for providing links to relevant data.

BACKGROUND

A business organization may use sales tools, such as a value estimating tool, to compare similar products offered by the business organization and its competitors. For example, the value estimating tool may be configured to estimate the return on investment, net present value and profit potentials of two or more products, and compare these products based on the results. Such a value estimating process usually uses a large amount of data input, including, for example, data related to product usage, transaction prices, various types of costs, etc. This data may be extracted from a variety of sources, such as, internal reports of the business organization, publications, websites, etc. When the value estimating tool is demonstrated by sales personnel to a client, the sales personnel may want to show sources of the input data to the client as proof or the client may want to check the sources of the input data to verify the validity of the data. Furthermore, the sales personnel may want to show, or the client may want to see, the actual source documents electronically when the value estimating tool is being demonstrated. Therefore, it is beneficial that the computer demonstration tools, such as value estimating tool, can enable data verification by providing links to source data files and/or web pages.

A method and system developed to automatically update a database of a comparative shopping system is disclosed in U.S. Patent Publication No. 2007/0073599 to Perry et al. ("the '599 publication"). In particular, the '599 publication discloses a method to automatically update the database containing product-related information. The method may include extracting product-related information from a plurality of merchant web pages, normalizing the product-related information into records, and storing the records in the database. The method disclosed by the '599 publication may further include comparing a plurality of stored records and updating the database based on the most current record.

Although the method and system of the '599 publication may alleviate some of the problems of existing systems, it may still be suboptimal. That is, because the sources are not saved in relation to the records, after the information is extracted from the merchant web pages, users of the comparative shopping system may not verify the validity of the records. Furthermore, since the source web pages where the information is extracted from are not stored, users of the system disclosed by the '599 publication may not be able to link to these web pages and review additional information on the web page that is relevant to the product. In addition, the user can not control which websites and data are displayed.

The system and method of the present disclosure are directed towards overcoming one or more of the constraints set forth above.

SUMMARY

In one aspect, the present disclosure is directed to a system for providing data verification. The system may include a storage device configured to store data and at least one source file having information related to the data. The system may further include a display device configured to display the data in at least one display field, wherein the display field associates with a verification panel. The system may also include a processor coupled to the storage device and the display device. The processor may be configured to create a link between the display field and the source file, wherein the link is displayed in the verification panel associated with the display field. The processor may be further configured to save link identification information in the storage device, wherein the link identification information includes category information of the display field and location information of the source file. The processor may also be configured to obtain the source file at the location specified by the link identification information, if the link is selected for display, and open the source file and display the source file on the display device.

In another aspect, the present disclosure is directed to a method for providing data verification. The data may be displayed in at least one display field and information related to the data may be stored in at least one source file. The method may include creating a link between the display field and the source file, wherein the link is displayed in a verification panel associated with the display field. The method may further include saving link identification information, wherein the link identification information includes category information of the display field and location information of the source file. The method may also include obtaining the source file at the location specified by the link identification information, if the link is selected for display. The method still further includes opening and displaying the source file.

BRIEF DESCRIPTION OF THE DRAWINGS

FIG. 4B is an illustration of an "add/edit link" window of a data verification module according to an exemplary embodiment of the present disclosure;

FIG. 4C is an illustration of an "export" window of a data verification module according to an exemplary embodiment of the present disclosure.

DETAILED DESCRIPTION

Figure 1:
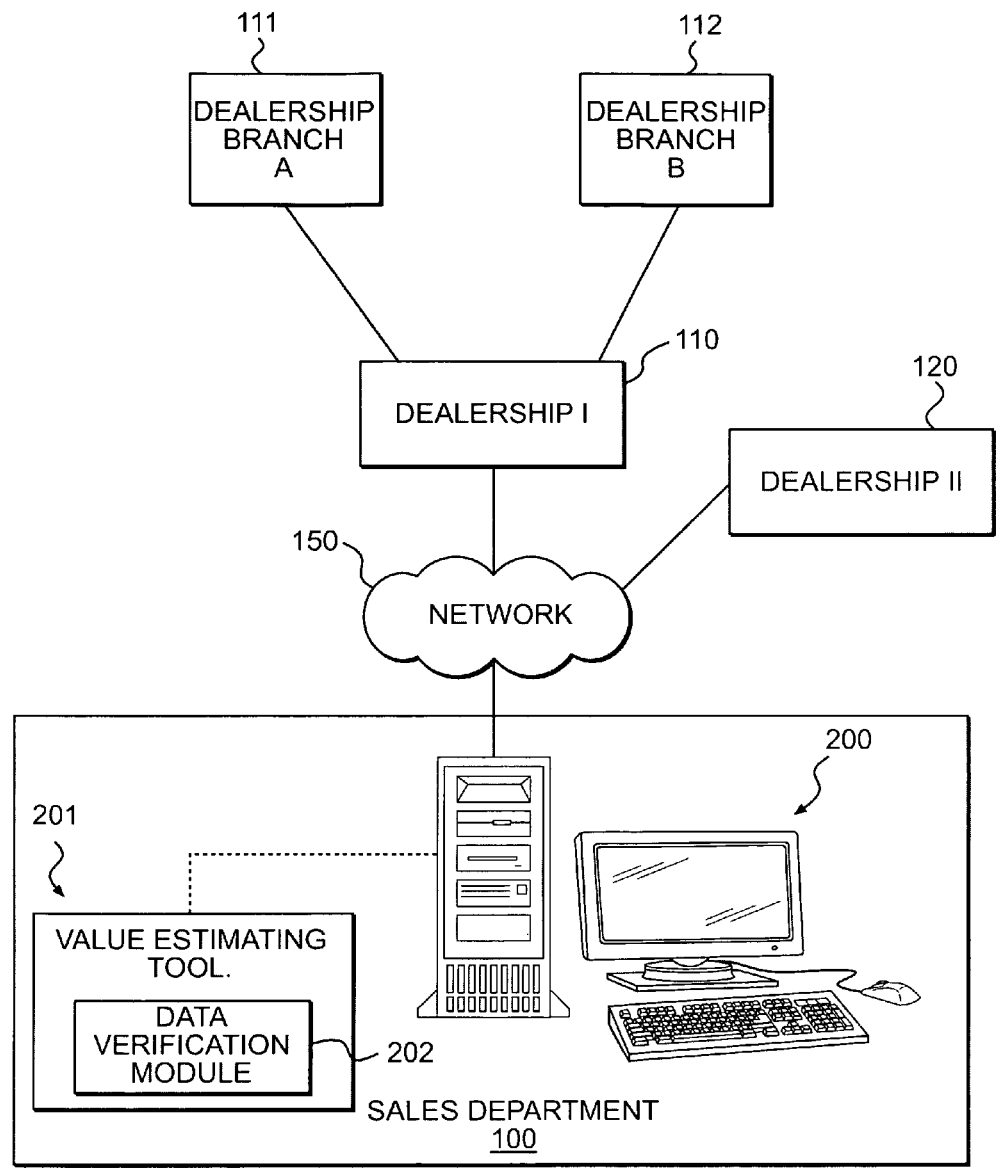
FIG. 1 is a schematic diagram of a network for providing data verification to a value estimating tool, according to an exemplary embodiment of the present disclosure.

FIG. 1 is a schematic diagram of a network for providing data verification to a value estimating tool, according to an exemplary embodiment of the present disclosure. A business organization may include one or more departments, each specializing in one or more business areas. For example, the business organization may include a sales department 100. Sales department 100 may use various sales tools to persuade and convince customers to buy products provided by the business organization. In some embodiments, sales department 100 of a business organization may conduct sales activities directly to the end-customer.

In some other embodiments, sales department 100 of the business organization may form a business relationship with dealerships, such that products are sold to the dealerships and the dealerships then conduct sales to individual customers. For example, as shown in FIG. 1, sales department 100 may form a business relationship with dealership I 110 and dealership II 120. Dealerships may carry brand products produced exclusively by the business organization. Dealerships may also carry products produced by several different business organizations. Sales department 100 may provide technical, marketing, and sales support to the dealerships to promote the sales of the products supplied by the business organization. For example, sales department 100 may provide marketing and sales tools to dealership I 110 and dealership II 120, and periodically update these tools. In one embodiment of the present disclosure, sales department 100 may provide a value estimating tool 201 to dealership I 110 and dealership II 120 to compare similar products offered by the business organization and its competitors. Data and programs associated with value estimating tool 201 may be constantly updated by sales department 100.

Consistent with one embodiment, dealerships may have one or more dealership branches in different locations. For example, dealership I 110 may have two dealership branches, including dealership branch A 111 and dealership branch B 112. Dealerships may supply products and provide marketing and sales support to its associated dealership branches. Consistent with one embodiment of the present disclosure, dealership I 110 may provide value estimating tool 201 to dealership branch A 111 and dealership branch B 112. Dealerships may also provide warehouses for centralized inventory storage. Dealership branches may engage sales to individual end-customers located in a certain region.

Sales department 100 of the business organization may use a computer 200 to conduct sales activities and communicate with dealerships. Computer 200 may include one or more computer assemblies configured to run a computer tool program. Computer 200 may be operated by sales department 100 and, as such, access to its contents may be limited to certain authorized personnel, such as, employees of sales department 100. Furthermore, different personnel may have different levels of access depending on the type of information or content they are authorized to view. Access may be regulated using any suitable password application known in the art. Data transferred to and from computer 200 may be protected using encryption software and other protection schemes, as would be apparent to one skilled in the art.

Computer 200 may include one or more software applications, including, for example, a value estimating tool 201. Value estimating tool 201 may run on computer 200, and may be accessed by authorized dealership I 110 and dealership II 120 via their respective computers (not shown) and a network 150, such as, for example, the Internet. It is also contemplated that value estimating tool 201 may be stored on a computer readable medium, such as a hard drive, computer disk, CD-ROM, or any other suitable medium, and may run on computers of the one or more dealerships and/or dealership branches associated with sales department 100.

Value estimating tool 201 may be used by a salesperson associated with sales department 100 to present product-related data to an end-customer in a comparison manner. For example, value estimating tool 201 may be used to display and compare the potential profitability of a product provided by the business organization and products provided by its competitors. Value estimating tool 201 may also show data that is used to derive the profitability, such as, for example, usage data and cost data, where the cost data may further include, for example, ownership cost data, operating cost data, life cycle cost data, etc. Consistent with one embodiment of the present disclosure, value estimating tool 201 may also be used by salespeople associated with dealership I 110, dealership II 120, and/or their dealership branches.

During the sales process, an end-customer may want to verify the validity of the displayed data and ask the salesperson to provide a source file from which the data is originally extracted. Alternatively, in order to better engage an end-customer, the salesperson using value estimating tool 201 may also want to show the source of the displayed data and prove its validity. In order to facilitate the need of data verification, value estimating tool 201 may include a data verification module 202.

Data verification module 202 may be used to create data links that link the data shown by value estimating tool 201 and the related source files from which the data is originally extracted. A user of value estimating tool 201, such as a salesperson, may use data verification module 202 to view the source files and/or show the source files to an end-customer. Consistent with one embodiment of the present disclosure, a user may use data verification module 202 to add, edit, delete and validate a data link. The user may also use data verification module 202 to export a data verification profile, which may include the data being displayed by value estimating tool 201, source file having information related to the data, and link identification information associated with the data link between the data and the source file. The data verification profile may be compressed and transmitted to other distributed users of value estimating tool 201. For example, a sales manager in sales department 100 may compile and export a data verification profile on computer 200, and send the profile off to salespeople at dealership I 110, dealership II 120, and/or their dealership branches. Distributed users may de-compress the received data verification profile and import the de-compressed data verification profile using value estimating tool 201 on their local computers.

Figure 2:
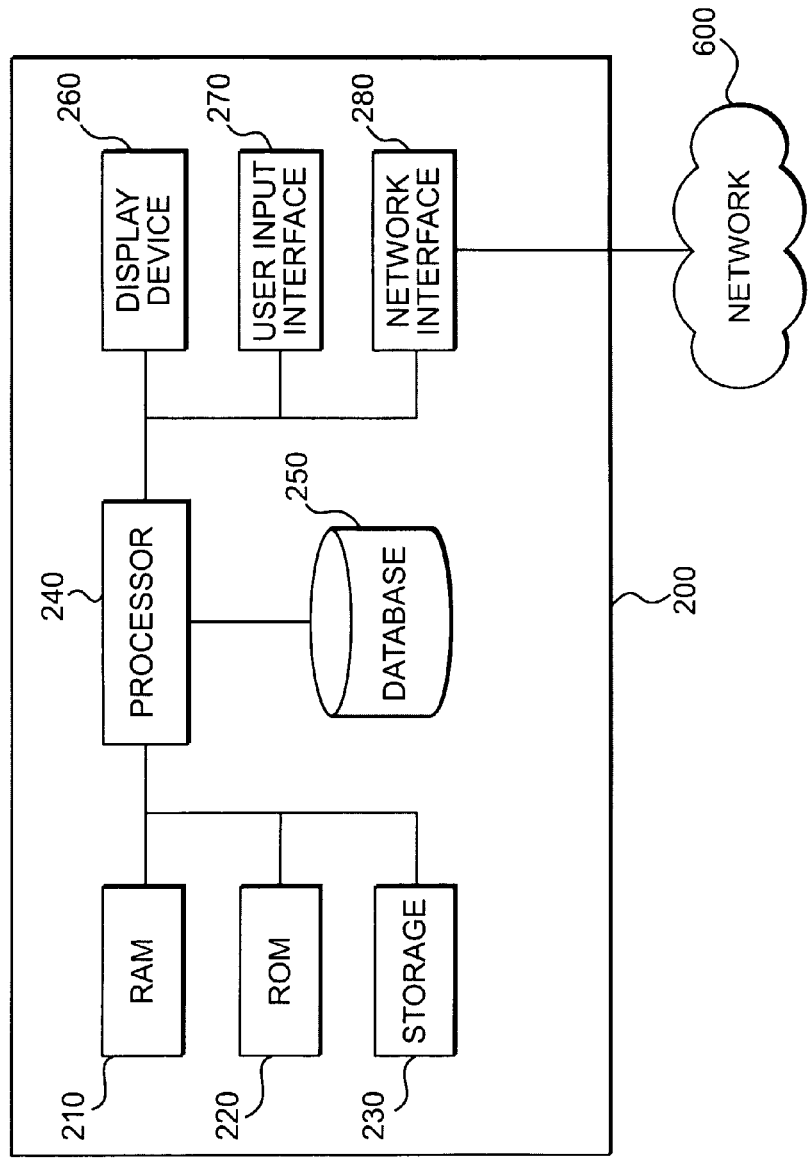
FIG. 2 is a schematic diagram of a computer providing data verification, according to an exemplary disclosed embodiment of the present disclosure.

FIG. 2 is a schematic diagram of a computer 200 providing data verification, according to an exemplary disclosed embodiment of the present disclosure. Although in the exemplary embodiment shown in FIG. 1, computer 200 is operated by sales department 100 of the business organization, it is contemplated that dealerships and/or dealership branches associated with sales department 100 may also have one or more computers configured to provide data verification, and the computers may be similar to computer 200 disclosed in FIG. 2.

As shown in FIG. 2, computer 200 may include a random access memory ("RAM") 210, a read only memory ("ROM") 220, a storage device 230, a processor 240, a database 250, a display device 260, a user input interface 270, and a network interface 280. It is contemplated that computer 200 may include additional, fewer, and/or different components than those listed above. It is understood that the type and number of listed devices are exemplary only and not intended to be limiting.

Processor 240 may be a central processing unit ("CPU"). Processor 240 may execute sequences of computer program instructions to perform various processes that will be explained later. The computer program instructions may be accessed and read from ROM 220, or any other suitable memory location, and loaded into RAM 210 for execution by processor 240. Depending on the type of computer 200 being used, processor 240 may include one or more printed circuit boards, and/or a microprocessor chip.

Display device 260 may be, for example, a computer screen, an operator panel, or an LCD. Display device 260 may provide a graphical user interface ("GUI") to provide information to the salespeople who use computer 200. According to one embodiment, display device 260 may be configured to interfaces of value estimating tool 201, and display the source files linked with data displayed on those interfaces. Display device 260 may further include an audio unit and provide an audible indication when a data link is invalid.

Computer 200 may be accessed and operated by a salesperson, such as an employee of sales department 100, using user input interface 270. User input interface 270 may be provided for the contract administrators to input information into computer 200, and may include, for example, a keyboard, a mouse, and/or optical or wireless computer input devices (not shown). Network interface 280 may provide communication connections such that computer 200 may be accessible remotely through computer networks.

Storage device 230 may include any type of mass storage suitable for storing information. For example, storage device 230 may include one or more hard disk devices, optical disk devices, or any other storage devices that provide data storage space. In one embodiment of the present disclosure, database 250 may store data used by value estimating tool 201 for comparison of different products, links between data and their source files, as well as copies of the source files. Database 250 may also include analysis and organization tools for analyzing and organizing the information contained therein.

Value estimating tool 201 may include one or more interfaces, in the form of charts, videos, tables, spreadsheets, web pages, templates or any other similar organizational structures, for conveying data to a salesperson and/or an end-customer, and receiving data from these people. For example, value estimating tool 201 may include a value estimation interface 300, depicted in FIG. 3 as it might appear on display device 260. Value estimation interface 300 may include one or more fields for receiving and displaying data. Value estimation interface 300 may include a variety of possible alternatives and they may be grouped in one or more general categories. For example, value estimation interface 300 may include a user information field 310, a menu bar field 320, a product comparison field 330, and a chart field 340. It should be understood that value estimation interface 300 may include fewer, more, or different general categories based on the characteristics and needs of sales department 100.

Authorized employees may access value estimating tool 201 and input information in value estimation interface 300 via user input interface 270. Administrators of value estimating tool 201 may change or update the category fields of value estimation interface 300 to adapt value estimating tool 201 for use with new customers or in new areas of business. For example, value estimation interface 300 may be updated to include more or less products for value comparison.

User information field 310 may include one or more display fields that display user information. For example, user information field 310 may display information of the salesperson who uses value estimating tool 201, and his/her affiliation information. User information field 310 may also display customer information if value estimating tool 201 is used for demonstration to an end-customer.

Figure 4A:
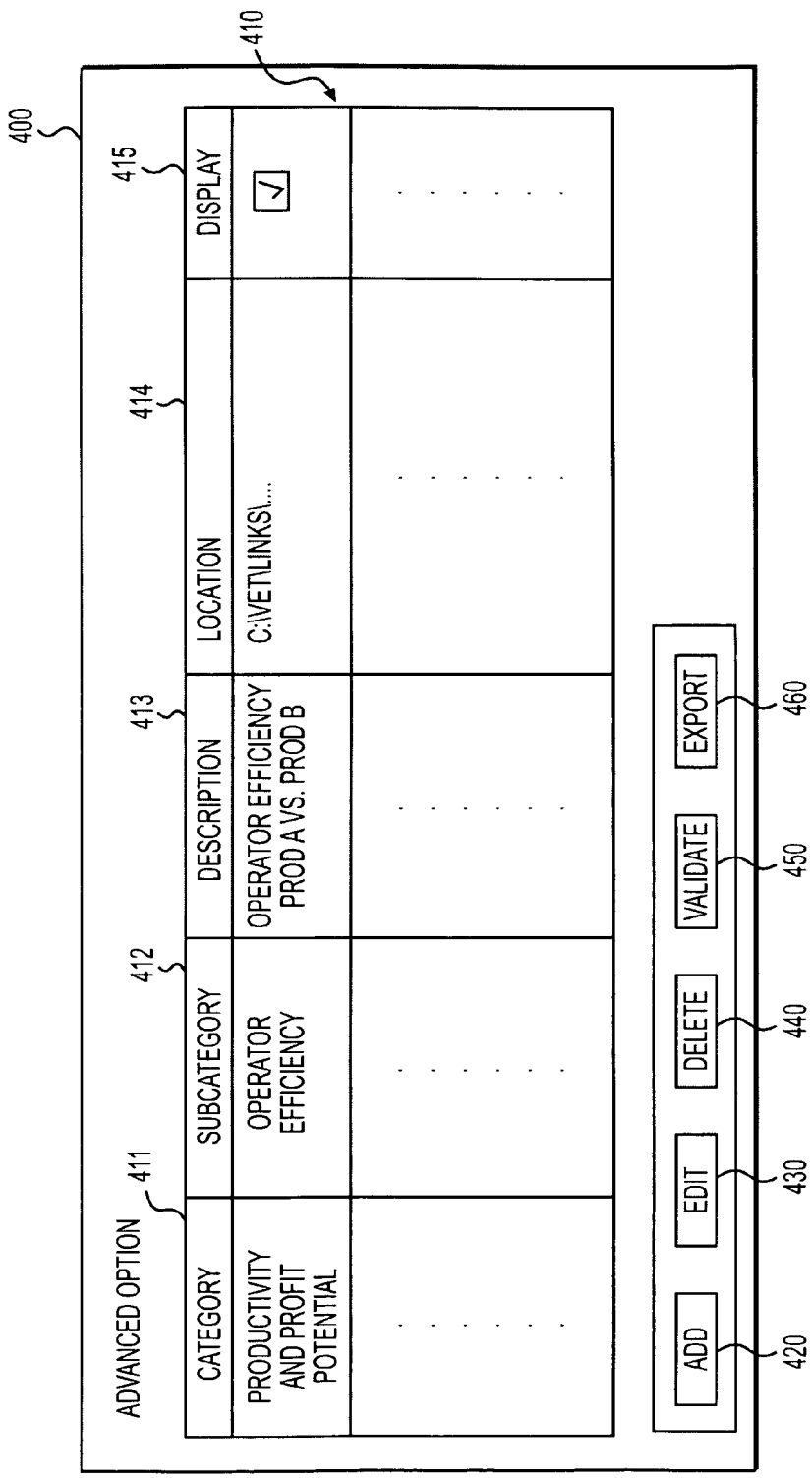
FIG. 4A is an illustration of an "advanced option" window of a data verification module according to an exemplary embodiment of the present disclosure.

Menu bar field 320 may include various menu buttons, such as, for example, a "file" button, an "options" button, a "reports" button, and a "help" button. Each button may be linked to a pull-down menu or pop-up windows. When a menu button is clicked, the pull-down menus or the independent interface may pop out and display on display device 260. These pull-down menus or pop-up windows may provide more options for operating value estimating tool 201. For example, the "file" button may be linked to options including "open file," "save," "new," "delete," and "exit." The "file" button may be further linked to a "save as default" option. The "save as default" option may allow a user to set up the value estimation interface 300 in a default manner, and save the interface set up into a default file. For example, the user may establish default language, default colors for the competitors, and which options are turned on/off, etc. When value estimating tool 201 is opened, value estimation interface 300 may be displayed with the default set-ups saved in the default file. Consistent with one embodiment of the present disclosure, the "option" button may be linked to an independent interface that provides more options for data verification. The independent interface associated with the "option" button is shown in FIG. 4A and will be described in greater detail in connection with that figure.

Figure 3:
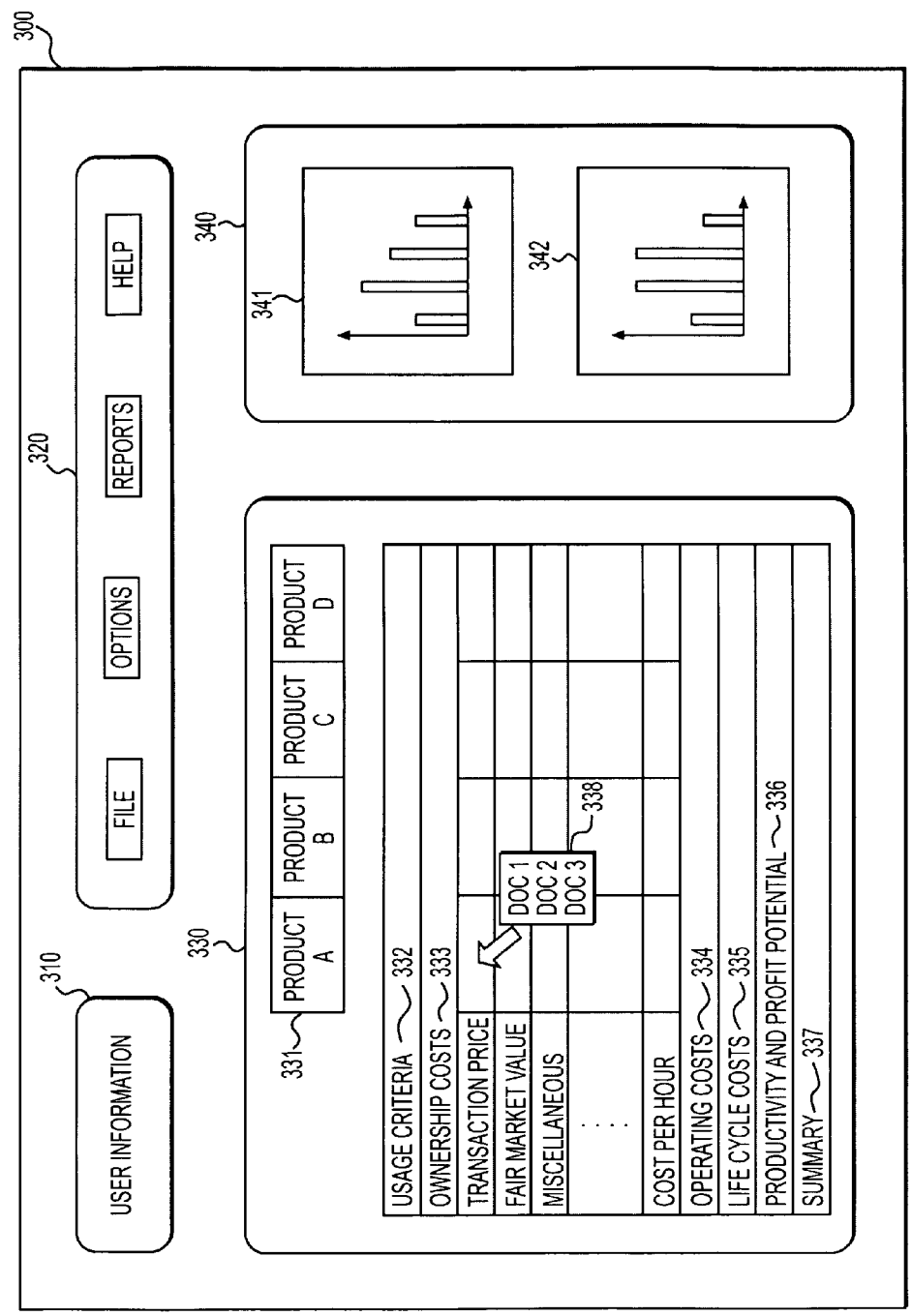
FIG. 3 is an illustration of an interface of a value estimating tool, according to an exemplary embodiment of the present disclosure.

Product comparison field 330 may include a plurality of display fields for displaying data related to several products, including the products offered for sale by the business organization and its competitors. As shown in FIG. 3, product comparison field 330 may include a product information field 331, and a plurality of product-related data display fields. Product information field 331 may include a plurality of sub-fields, each displaying information associated with a product. For example, product information field 331 may include a field for product A, a field for product B, a field for product C, and a field for product D. Consistent with one embodiment of the present disclosure, product A may be produced by the business organization and products B, C, and D may be comparable to product A, but are produced by competitors. Product information displayed in product information field 331 may include the names of the products, model information, and producer information. Each product field may be highlighted with a different color.

The product-related data display fields may be organized in a hierarchy. For example, the product-related data display fields may be divided into several maincategories, including a usage criteria category 332, an ownership costs category 333, an operating costs category 334, a life cycle costs category 335, a productivity and profit potential category 336, and a summary category 337. Any of these maincategories may further include a plurality of subcategories. For example, ownership costs category 333 may include a transaction price subcategory, a fair market value subcategory, a miscellaneous subcategory, a cost per hour subcategory, etc. Consistent with an embodiment of the present disclosure, value estimation interface 300 may display subcategory data associated with one maincategory at a time, and subcategory data associated with other maincategories may be folded. Subcategories of a maincategory may be pulled out when the maincategory is selected. For example, as shown FIG. 3, subcategories of ownership costs category 333 may be unfolded while the ones of the other maincategories are folded.

Product data displayed in the subcategory data fields may be stored in storage device 230 and/or database 250, and may be loaded automatically to the display fields by processor 240 upon request. Consistent with one embodiment, product-related data may be saved as a .VET data file stored in storage device 230 and/or database 250. For example, a user may use the "open file" option under the "file" button of menu bar field 320, and on a corresponding pop-up window, the user may select a .VET data file stored in storage device 230 or database 250. Consistent with another embodiment, the user of value estimating tool 201 may input data into the display fields via user input interface 270. The user may also edit and overwrite the data loaded in as a .VET file. User input/edited data may be saved as a new .VET file or to replace the original .VET file. For example, a user may use the "save" or "save as" option under the "file" button of menu bar field 320, and on a corresponding pop-up window, the user may specify a directory in storage device 230 or database 250 for saving the .VET data file.

According to one embodiment of the present disclosure, some display fields in product comparison field 330 may be driving fields, and some others may be driven fields. The data of the driven fields may be determined by processor 240, based on data input to the driving fields. For example, certain data of the display fields in productivity and profit potential category 336 may be determined automatically by processor 240, once data is input into usage criteria category 332, ownership costs category 333, operating costs category 334 and certain fields in the productivity and profit category 336. Consequently, categories 332-334 are driving fields and category 335 and 336 a driven field. Consistent with one embodiment, driving fields may be editable by the user, but driven fields may be edit-protected and may be updated based on edits to the driving fields. Accordingly, for example, edits to the categories 332-335 may result in automatic updates in productivity and profit potential category 336.

Consistent with one embodiment of the present disclosure, data displayed in a driving field of product comparison field 330 may be verified by data links. A data link may associate the display field with a source file that contains information related to the data shown in that display field. For example, a source file linked with the display field as shown in FIG. 3 may be a market report of product A that contains transaction price information of the product. As shown in FIG. 3, the display fields corresponding to the transaction price subcategory may be associated with a verification panel 338. Verification panel 338 may show on value estimation interface 300 upon a selection of a display field in that subcategory row that it is associated with, such as, for example, a mouse right-click on the display field. One or more source files may be linked to the display field and their file names may be listed on verification panel 338. A source file may contain information related to the data of the corresponding display field. For example, a spreadsheet that compares the transaction prices of products A, B, C, and D may be displayed in a verification panel associated with all four display fields of transaction price subcategory.

A data link may be characterized by unique link identification information. Link identification information may include category information of the display field and location information of the source file. For example, for the exemplary display field, as shown in FIG. 3 by the arrow, category information of its data link may include information of ownership costs category 333 and the transaction price subcategory. The location information of the source file may include a detailed file path of the source file as it is stored on storage device 230. For example, the file path may begin with a disk name, followed by one or more folder names, each separated by a backslash, such as, "C:/documents/VET/SourceFiles/TransPrice.doc". The file path may be an absolute path or a relative path. For example, the source file may be stored in the folder of the value estimating tool 201 and its file path may be a relative path to the aforementioned folder. When a source file listed in verification panel 338 is selected by the user, the source file may be retrieved from storage device 230 based on the location information provided by the link identity information and may be further opened with appropriate tools.

A user may add, edit, delete or validate a data link using the "option" button in menu bar field 320. The user may also export a data verification profile using the "option" button. The data verification profile may contain the data displayed in product comparison field 330, source files associated with the data, and data links linking the data and source files. An "advanced option" window may pop up on display device 260 once the "option" button is selected by the user. The user may further select "add," "edit," "delete," "validate" or "export" buttons on the "advanced option" window, and corresponding windows may pop out in response to the selection. The "advanced option" window, "add/edit link" window and "export" window will be shown in FIG. 4A, FIG. 4B, and FIG. 4C respectively, and will be described in greater details in a later part of the present disclosure.

Value estimation interface 300 may further include a chart field 340. Chart field 340 may display one or more charts for visualizing the data of several products in a comparison manner. For example, chart field 340 may include a first chart 341 and a second chart 342. First chart 341 may be a bar chart comparing the operating costs among products A, B, C and D and second chart 342 may be a bar chart comparing the profit potential among these products. It is contemplated that first chart 341 and second chart 342 may be any other types of charts suitable for visualizing the data. Consistent with one embodiment, first chart 341 and second chart 342 may be created and updated automatically by processor 240, based on the data loaded or input into the display fields in product comparison field 330.

FIG. 4A is an illustration of an "advanced option" window 400 of data verification module 202, according to an exemplary embodiment of the present disclosure. "Advanced option" window 400 may include a data link display field 410, and a menu bar field, which may further include an "add" button 420, an "edit" button 430, a "delete" button 440, a "validate" button 450, and an "export" button 460. Data link display field 410 may display link identification information of all the currently available data links. For example, data link display field 410 may include a category display column 411 to display the category affiliations of the data links, a subcategory display column 412 to display the category affiliations of the data links, a description display column 413 to display a brief description of the source files that are linked to the data, and a location display column 414 to display file paths of the source files. As shown in FIG. 4A, an exemplary data link may be associated with data displayed in the operator efficiency subcategory of productivity and profit potential category 336. The source file may be located at a file path specified by "C:\VET\LINKS\ . . . ," and may be described as "operator efficiency product A vs. product B."

Data link display field 410 may further include a display check-box column 415. Display check-box column 415 may include a check-box for each data link to indicate whether the data link will be displayed in the verification panel (e.g, verification panel 338) of the associated display field. If a display check-box is checked, the corresponding data link may be added to the verification panel, and if the display check-box is un-checked, the corresponding data link may be removed from the verification panel.

Information displayed in data link display field 410 may be input by a user using "add" button 420 or "edit" button 430. "Add" button 420 may be used to add a data link. Once a data link is added, its link identification information may be automatically added in data link display field 410. "Edit" button 430 may be used to edit an existing data link. Once a data link is edited, its link identification information may be automatically updated in data link display field 410 to reflect the edits. In response to a user's selection of "add" button 420 or "edit" button 430, an "add/edit link" window 42, as depicted in FIG. 4B, may pop up on display device 260.

"Add/edit link" window 42 may include, among other things, a category input field 421, a subcategory input field 422, a description input field 423, a file type input field 424, a location input field 425, a display selection field 426, and a sort order selection field 427. It is contemplated that "add/edit link" window 42 may include additional, fewer, and/or different components than those listed in FIG. 4B. It is understood that the type and number of listed input fields are exemplary only and not intended to be limiting.

Category input field 421 may include an input bar for the user to input the category that the data link is associated with. Category input field 421 may also include a drop-down menu that lists available options of categories, for examples, categories 332-337 shown in FIG. 3. The user may select a category from the list without manually typing in the category. After a category is selected, the category name may be automatically displayed in the input bar. Similarly, subcategory input field 422 may also include an input bar for user input and a drop-down menu that lists available options of subcategories. The drop-down menu of subcategory input field 422 may be generated/updated automatically by processor 240 based on the information of category input field 421. For example, if ownership costs category 333 is selected in category input field 421, the drop-down menu of subcategory input field 422 may list the transaction price subcategory, the fair market value subcategory, the miscellaneous subcategory, cost per hour subcategory, etc.

Description input field 423 may include an input bar for the user to type in descriptions of the link. File type input field 424 may include a check-box for "link" and a check-box for "file." The user may check "link" if the source file is a web page and only a link (e.g., URL) is to be saved instead of the actual file. The user may check "file" if a copy of the source file is saved in storage device 230. Location input field 425 may include an input bar for the user to type in the file path of the associated source file. Location input field 425 may further include a "browse" button which may be used to browse through file directories on computer 200 and select the file path for the source file. Once the file path is selected, it may automatically display in location input field 425.

Display selection field 426 may include a check-box for "yes" and a check-box for "no." The user may check "yes" if he/she wants the source file to be listed on verification panel (e.g., verification panel 338). The user may check "no" if he/she does not want the source file to be listed. Sort order input field 427 may include a drop-down menu that allows the user to select which order the files are displayed in the verification pane. Each sort order may be indicated by a number. For example, "1" may correspond to displaying the data link on the top of verification panel 338 and "2" may correspond to displaying the data link as a second document on verification panel 338. The user may sort the data links by relevance, size, or alphabetic order of the source files.

"Add/edit link" window 42 may further include an "Ok" button and a "Cancel" button. If the "Ok" button is selected, all the input information in input fields 421-427 may be saved as link identification information in storage device 230 or database 250, and "add/edit link" window 42 may hide. If link identification information previously existed for the current data link, it may be updated and overwritten by the new edits. The saved link identification information may be automatically reflected in data link display field 410. If the "Cancel" button is selected, "add/edit link" window 42 may hide without saving any input information in input fields 421-427.

"Delete" button 440 may allow a user to delete an existing data link. When the existing data link is selected and "delete" button 440 is clicked, link identification information of the highlighted data link may be deleted from storage device 230 or database 250, and the displayed information in data link display field 410 may be automatically removed.

"Validate" button 450 may allow a user to validate an existing data link. When the existing data link is selected and "validate" button 450 is clicked, link identification information of the highlighted data link may be validated. For example, processor 240 may be configured to search for the corresponding source file under the file path provided by the link identification information. If the source file exists under the specified file path, the data link may be determined valid. Otherwise, the data link may be determined invalid, and accordingly, the data link may be highlighted, for example, with a different color. Consistent with one embodiment, if a data link is determined as invalid, it may be automatically removed from the verification panel.

"Export" button 460 may allow a user to export a data verification profile. According to one embodiment of the present disclosure, a data verification profile may include displayed data, source files associated with these data, and data links that link the data with their associated source files. For example, the data verification profile may include a .VET data file which contains data displayed on value estimation interface 300, and copies of the source files that contain information relevant to the data. Consistent with one embodiment, if a source file is a web page, the data verification profile may include the URL link to the web page, instead of an actual copy of the web page file. Data verification profile may further include a link information document, such as a spreadsheet, which contains link identification information of data links that associate the data with their corresponding source files.

According to one embodiment, in response to a user's selection of "export" button 460, an "export" window 46, as depicted in FIG. 4C, may pop up on display device 260. Via "export" window 46, the user may select data links and source files to be included in the data verification profile. "Export" window 46 may include, among other things, an export selection column 461, a file name display column 462, a file path display column 463, a file size display column 464, and a description display column 465. It is contemplated that "export" window 46 may include additional, fewer, and/or different components than those listed in FIG. 4C. It is understood that the type and number of listed input fields are exemplary only and not intended to be limiting.

File name display column 462 may display the name of the source file for each data link. File path display column 463 may display the file path of the source file. File size display column 464 may display the size of source file, i.e., storage space needed to store the source file. For example, a source file of 73 kB in size may occupy 73 kB storage space in storage device 230. The information displayed in display columns 462-465 may be used by the user to decide whether or not to include a data link in the data verification profile.

Export selection column 461 may include a check-box for each data link listed in "export" window 46. For example, if the check-box is checked, the data link and source file may be included in the data verification profile. Otherwise, if the check-box is unchecked, the data link and source file may not be included in the data verification profile.

"Export" window 46 may further include an "Export" button and a "Cancel" button. If the "Export" button is selected, data links that are checked for exportation and their corresponding source files may be included in the data verification profile, and "export" window 46 may hide. The exported data verification profile may be stored on storage device 230. Consistent with one embodiment, data verification profile may be further compressed into one file to save storage space and/or to expedite file transfer. If the "Cancel" button is selected, "export" window 46 may hide without exporting any data links.

The exported data verification profile may be transferred among users of value estimating tool 201. For example, the data verification profile may be created and exported by a salesperson affiliated with sales department 100, and may be transferred from the sales department 100 to dealership I 110, dealership II 120, and/or their dealership branches. Consistent with one embodiment, the data verification profile may be transferred as an attachment to an email, or via a file transfer protocol. The received data verification profile may be de-compressed and the .VET data file may be imported into value estimating tool 201, for example, using the "open file" option under the "file" button of menu bar field 320.

Figure 5:
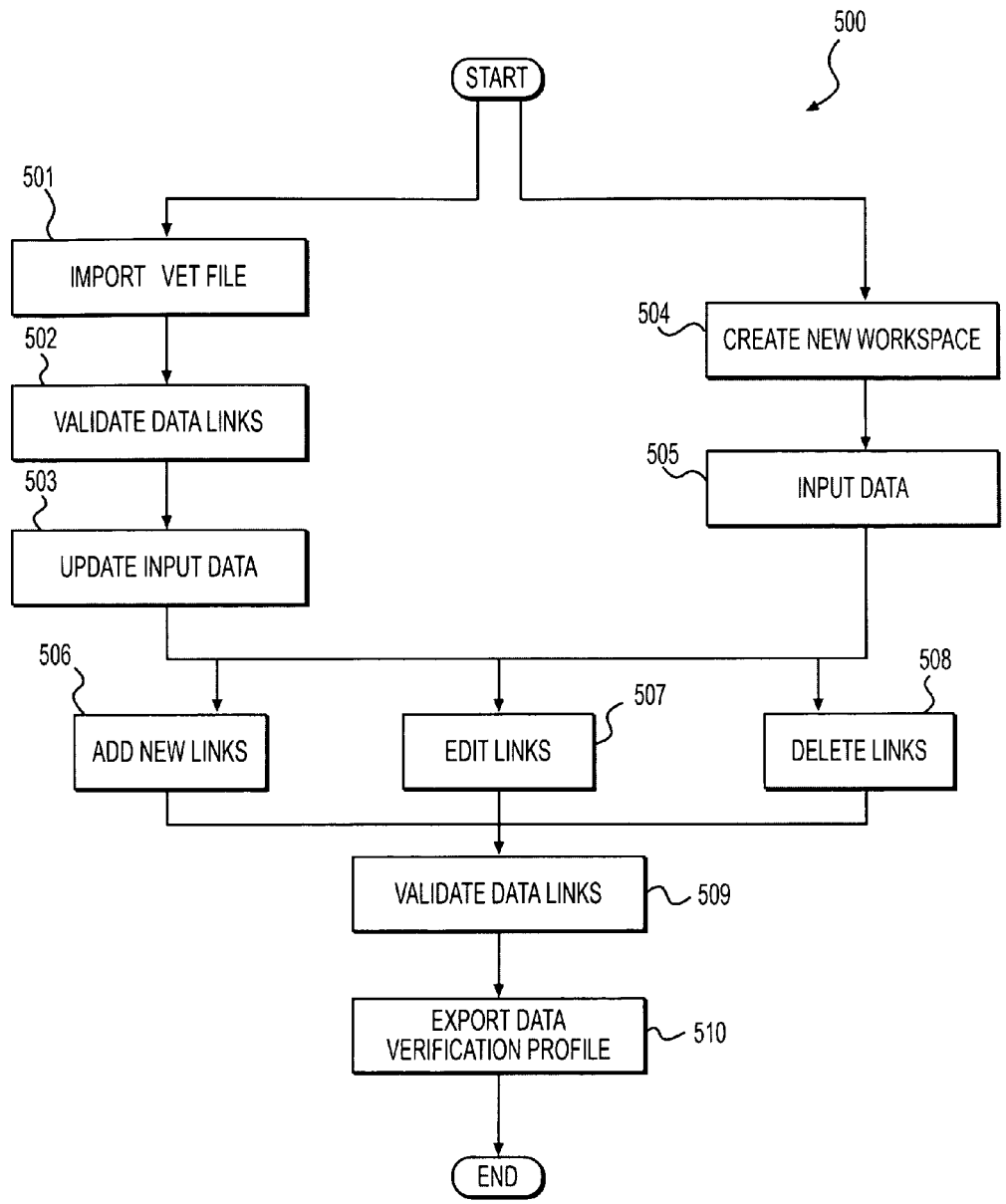
FIG. 5 is a flow chart of an exemplary operation process for a data verification module, consistent with the disclosed embodiment shown in FIG. 1.

FIG. 5 is a flow chart of an exemplary operation process 500 for data verification module 202, consistent with the disclosed embodiment shown in FIG. 1. Process 500 may begin when a .VET data file is imported into value estimating tool 201 (Step 501). The .VET data file may be stored in storage device 230 or database 250. Consistent with one embodiment, the .VET data file may be a part of a data verification profile. The data verification profile may be received from a remote computer, or exported on the local computer (e.g., computer 200). In step 501, the .VET data file may be selected using the "open file" option under "file" button in menu bar field 320. Once the .VET data file is selected, processor 240 may be configured to load the data into the display fields on value estimation interface 300.

After the data is loaded, data links associated with the loaded data may be validated (Step 502). The data links may be characterized by link identification information stored in the data verification profile. In particular, the link identification information may include file paths that specify the locations of source files linked to the data. In step 501, processor 240 may be configured to search for the source file under the specified file path for each data link. The data link may be determined valid if the source file exists under the specified file path, otherwise, the data link may be determined invalid. Processor 240 may be configured to validate all the data links in the data verification profile. Consistent with one embodiment of the present disclosure, validation of the data links may be performed automatically by processor 240 after importation of the .VET data file. Alternatively, validation of the data links may be performed upon user request. For example, data link validation may be initiated using the "validate" button on "advanced option" window 400 as shown in FIG. 4A.

Input data loaded from the .VET data file may be updated by the user (Step 503). Consistent with on embodiment, the user may edit and overwrite the data in any driving fields of product comparison field 330. Accordingly, the data in the driven fields may be updated automatically by processor 240.

As an alternative to Steps 501-503, process 500 may begin when a new workspace is created with value estimating tool 201 (Step 504). For example, the user may create a new workspace using the "new" option under the "file" button of menu bar field 320. When a new workspace is created, display fields in product comparison field 330 may be blanks and the user may input data to these display fields via user input interface 270 (Step 505). Consistent with one embodiment, once driving fields are filled by the user, the driven fields of product comparison field 330 may be automatically filled by processor 240.

After the display fields on value estimation interface 300 are filled in Step 505 or updated in Step 503, new data links may be added to associate the display fields with source files that contain information related to the data displayed in those display fields (Step 506). For example, the user may first select the "option" button of menu bar field 320, and then on the popped-up "advanced option" window 400, the user may use "add" button 420 to create a new link via "add/edit link" window 42. Consistent with one embodiment, in adding a new data link, the user may specify link identification information, including, for example, the category and subcategory that the data link is associated with, a description of the data link, file type of the linked source file, and file path of the source file. The user may further specify whether the data link is to be displayed on a verification panel associated with the corresponding display field, and if yes, an order in which the data links may be sorted. Once a data link is added, the link identification information may be saved on storage device 230 or database 250. Furthermore, if the data link is checked for display, it may be displayed on the verification panel.

Existing data links may also be edited (Step 507). For example, the user may again select the "option" button of menu bar field 320, and then on the popped-up "advanced option" window 400, the user may use "edit" button 430 to edit the existing link via "add/edit link" window 42. Existing data links may further be deleted (Step 508). For example, the user may use "delete" button 440 on the popped-up "advanced option" window 400 to delete a link. Once a data link is deleted, it may be automatically removed from the verification panel by processor 240.

The added/edited data links may be validated during any time of process 500 (Step 509). Consistent with one embodiment of the present disclosure, the user may initialize a data link validation using the "validate" button on "advanced option" window 400. Upon the request, processor 240 may be configured to search for the source file under the file path specified by the link identification information of the data link. The data link may be determined valid if the source file exists under the specified file path. Otherwise, the data link may be determined invalid. If a data link is determined invalid, the corresponding data link may be highlighted in data link display field 410. Accordingly, the data link may be grayed-out or removed from the verification panel. Consistent with one embodiment, display device 260 may be configured to provide a warning signal, such as a sound or a flash, if a data link is invalid.

The input data to the display fields, source files associated with the data, and data links that link the source files to the display fields may be exported to a data verification profile (Step 510). For example, the user may use "export" button 460 on the popped-up "advance option" window 400 to export the data verification profile. Consistent with one embodiment, the user may select the data links and source files to be included in the data verification profile. Processor 240 may be configured to create a .VET data file which contains the input data to the display fields, and a link information file which contains the link identification information of the data links. Processor 240 may be further configured to compress the .VET data file, the link information file, and the source files into a single data verification profile. The compressed data verification profile may be transferred between users of value estimating tool 201, for example, between a salesperson in sales department 100 and a dealer at dealership 110. Process 500 may terminate after Step 510.

Industrial Applicability

The disclosed system and method may have applicability in a computer demonstration process that involves data verification. The system may include a value estimating tool 201 to compare several products offered for sale, and value estimating tool 201 may include a data verification module 202 to provide proof of data validity and show the source files that contain information related to the data. Data verification module 202 may be configured to add, edit, delete, and validate a data link. Data verification module 202 may be further configured to export a data verification profile that contains the data, source files associated with the data, and data links that link the source files with the data. Data verification module 202 may also be configured to import the data verification profile into value estimating tool 201.

For example, a value estimating tool 201 may be installed on a computer 200 operated by sales department 100. A salesperson of sales department 100 may input data into display fields of value estimation interface 300, using computer 200. The salesperson may further add one or more data links associated with one or more data he/she entered on value estimation interface 300. Link identification information of the added data links may be saved and stored on storage device 230 or database 250. The salesperson may edit existing data links and the corresponding link identification information may be updated according to the edits. The salesperson may also delete existing data links. The salesperson may further use data verification module 202 to validate existing data links and determine whether the corresponding source files exist under the file paths specified by the link verification information.

After all the data is entered and all the data links are created and validated, the salesperson may export the entered data, the source files and the data links into a data verification profile. The data verification profile may be compressed. The salesperson may send the data verification profile to a dealer at dealership I 110, via network 150. Dealership I 110 may own another local computer similar to computer 200, and a value estimating tool 201 may be installed on the local computer. The dealer may decompress the data verification profile, and import a .VET data file into value estimating tool 201 on the local computer. The dealer may demonstrate value estimating tool 201 to an end-customer and show the source files of a data value by selecting the data links listed on a verification panel associated with the display field where the data value is displayed.

The dealer at dealership I 110 may make further edits to the display data and/or data links using data verification module 202 on the local computer. The dealer at dealership I 110 may also export a new data verification profile to its associated dealership branches, such as dealership branch A 111, and dealership branch B 112.

Although the disclosed embodiments are described in association with a data verification process associated with a value estimating tool, the disclosed data verification method may be used in any computer demonstration tools that display data extracted from various sources. The disclosed data verification method may effectively verify the validity of the data. Furthermore, the disclosed data verification method may display a copy of the actual source file or an actual web page that contains information of the data. As a result, the demonstration may be more effective to engage and convince the audiences.

It will be apparent to those skilled in the art that various modifications and variations can be made in the disclosed system and method without departing from the scope of the disclosure. Additionally, other embodiments of the disclosed system and method will be apparent to those skilled in the art from consideration of the specification. It is intended that the specification and examples be considered as exemplary only, with a true scope of the disclosure being indicated by the following claims and their equivalents.

What is claimed is:

1. A system for providing data verification for a plurality of products, the system comprising:
   a storage device configured to store data relating to the plurality of products and at least one source file having information to verify the validity of the data relating to the plurality of products;
   a display device configured to display a product comparison table for comparing a plurality of products, the product comparison table including:
      a plurality of product comparison display fields displaying product comparison data comparing the plurality of products in a plurality of categories; and
      a verification panel associated with at least one of the product comparison display fields, the verification panel containing at least one link that links to the at least one source file, wherein the information in the at least one source file verifies the validity of the comparison data displayed in the at least one product comparison display field; and
   a processor coupled to the storage device and the display device, wherein the processor is configured to:
      control the display device to display the product comparison table;
      create the at least one link between the at least one product comparison display field and the at least one source file, wherein the at least one link is displayed in the verification panel associated with the at least one product comparison display field;
      save link identification information in the storage device, wherein the link identification information includes category information of the at least one product comparison display field and location information of the at least one source file;
      export a data verification profile, wherein the data verification profile includes the product comparison data, the at least one source file containing the information verifying the validity of the product comparison data displayed in the at least one product comparison display field, and link identification information associated with the at least one link; and
      edit the at least one link.

2. The system of claim 1, further including a user input interface coupled to the processor, wherein the user input interface is configured to allow a user to select the at least one link for display from the verification panel, wherein the processor is further configured to:
   obtain the at least one source file at a location specified by the link identification information, if the at least one link is selected for display; and
   open the at least one source file and display the information, contained in the source file, verifying the validity of the comparison data displayed in the at least one product comparison display field, on the display device.

3. The system of claim 1, wherein the at least one product comparison display field is associated with a maincategory and at least one subcategory, and wherein the category information of the at least one product comparison display field includes information of the maincategory and a subcategory that the at least one product comparison display field is associated with.

4. The system of claim 1, wherein the processor is further configured to:
   validate the at least one link by determining if the at least one source file exists at a location specified by the at least one link; and provide a warning if the at least one source file does not exist at a location specified by the at least one link.

5. The system of claim 1, wherein the processor is further configured to delete an existing link.

6. The system of claim 1, wherein the processor is further configured to compress the data verification profile.

7. The system of claim 1, wherein the at least one source file is a web page and the location information of the at least one source file includes a URL of the web page.

8. A computer-implemented method for providing data verification for a plurality of products, the method comprising:
- importing a data verification file;
- displaying, based on the data verification file, a product comparison table for comparing the plurality of products, the product comparison table including:
  - a plurality of product comparison display fields containing product comparison data comparing the plurality of products in a plurality of categories; and
  - a verification panel associated with at least one of the product comparison display fields, the verification panel containing at least one link that links to at least one source file, the at least one source file containing information that verifies the validity of the product comparison data displayed in the at least one product comparison display field;
- wherein the import data verification file contains the product comparison data displayed in the at least one product comparison display field, the at least one source file containing the information that verifies the validity of the product comparison data displayed in the at least one product comparison display field, and link identification information, wherein the link identification information includes category information of the at least one product comparison display field and location information of the at least one source file;
- editing the at least one link:
- obtaining, from the at least one source file at the location specified by the at least one link if the at least one link is selected, the information that verifies the validity of the product comparison data displayed in the at least one product comparison display field; and
- displaying the obtained information that verifies the validity of the product comparison data displayed in the at least one product comparison display field.

9. The method of claim 8, wherein the at least one product comparison display field is associated with a maincategory and at least one subcategory, and wherein the category information of the at least one product comparison display field includes information of the maincategory and a subcategory that the at least one product comparison display field is associated with.

10. The method of claim 8, further including:
- validating the at least one link by determining if the at least one source file exists at a location specified by the at least one link; and
- providing a warning if the at least one source file does not exist at a location specified by the at least one link.

11. The method of claim 8, further comprising deleting an existing link.

12. The method of claim 8, wherein importing the data verification file includes de-compressing the data verification file.

13. The method of claim 8, wherein the at least one source file is a web page and the location information of the at least one source file includes a URL of the web page.

14. A non-transitory computer readable medium having stored thereon instructions that, when executed by a computer processor, cause the computer processor to perform a method for providing data verification for a product, the method comprising:
- importing a data verification file;
- displaying, based on the data verification file, a product comparison table for comparing a plurality of products, the product comparison table including:
  - a plurality of product comparison display fields containing product comparison data comparing the plurality of products in a plurality of categories; and
  - a verification panel associated with at least one of the product comparison display fields, the verification panel containing at least one link that links to at least one source file, the at least one source file containing information that verifies the validity of the product comparison data displayed in the at least one product comparison display field;
- wherein the import data verification file contains the product comparison data displayed in the at least one product comparison display field, the at least one source file containing the information that verifies the validity of the product comparison data displayed in the at least one product comparison display field, and link identification information, wherein the link identification information includes category information of the at least one product comparison display field and location information of the at least one source file;
- editing the at least one link;
- obtaining, from the at least one source file at the location specified by the at least one link if the at least one link is selected, the information that verifies the validity of the product comparison data displayed in the at least one product comparison display field; and
- displaying the obtained information that verifies the validity of the product comparison data displayed in the at least one product comparison display field.

\* \* \* \* \*